Aug. 5, 1969                G. G. JOSEPH ETAL                3,459,611
          METHOD OF MAKING A MATTRESS FROM FOAMED PLASTIC MATERIAL
Filed July 18, 1966                                   2 Sheets-Sheet 1

INVENTORS
GUY G. JOSEPH
ROBERT K. TEVERBAUGH
BY
Eli Mullin
ATTORNEY

Aug. 5, 1969     G. G. JOSEPH ETAL     3,459,611

METHOD OF MAKING A MATTRESS FROM FOAMED PLASTIC MATERIAL

Filed July 18, 1966     2 Sheets-Sheet 2

INVENTORS
GUY G. JOSEPH
ROBERT K. TEVERBAUGH

BY

*Eli Mullin*

ATTORNEY

United States Patent Office 3,459,611
Patented Aug. 5, 1969

3,459,611
METHOD OF MAKING A MATTRESS FROM FOAMED PLASTIC MATERIAL
Guy G. Joseph, Highland Park, and Robert K. Teverbaugh, Chicago, Ill., assignors, by mesne assignments, to Holiday Inns of America, Inc., Memphis, Tenn., a corporation of Tennessee
Filed July 18, 1966, Ser. No. 565,839
Int. Cl. B32b 5/18; B29c 17/00
U.S. Cl. 156—78                          3 Claims

ABSTRACT OF THE DISCLOSURE

A mattress is comprised of a pair of cover members made of a compressible material, such as polyurethane foam, mated and joined together to afford a cavity therein and has a compressible support means positioned therein only in frictional contact with said cover member. The invention includes a method for making the aforementioned mattress.

---

This invention relates generally to a method for manufacturing mattresses from foam material, such as plastic or rubber and the mattress formed thereby. More particularly, the invention relates to a method for manufacturing mattresses by molding either by pour mold or by heat or compression forming, polyurethane foam or the like into housing segments and encasing therein cushioning materials or units such as springs, and the invention further relates to the mattress formed by said method.

Prior to the present invention, the method for manufacturing mattresses required a great expenditure of both time and labor. For example, a commonly used prior conventional method for fabricating mattresses comprised the covering of the top and bottom of a pre-assembled spring unit with insulator pads which were then "hog-ringed" to the edges of the spring unit. Cotton pads or other padding materials which had previously been garnetted into the desired thickness were placed over the top and bottom insulator pads. Sheets of ticking were then placed over the garnetted pads. The entire assembly was then compressed into a retainer box and either tufted through with buttons to secure the assembled unit, or held together by sewing the top ticking to the border of the box. The assembled mattresses are then referred to as smooth top or tuftless mattresses. Finally the sides or box of the mattress were sewed to the top and bottom sheets of ticking.

The mattress manufactured by the above-described method, although widely used, nevertheless had many undesirable features in addition to those initially mentioned. For example, during the normal use of the mattress, the fibrous component parts, such as the insulator pads, had the tendency to erode causing the inside of the mattress to fill with small particles. This appreciably reduced the supporting capability of the mattress. Moreover, to the allergic person these particles oftentimes had an extremely harmful and unhealthy effect. Still a further problem with these mattresses was the continual flexing of the same frequently caused the string connectors of the tufting to loosen and break, resulting in the mattress padding shifting, pulling apart and eventually forming pronounced and permanent irregularities in the contour of the mattress surface. Similarly, the tuftless mattress would develop an uneven contour due to normal use. This, of course, substantially reduced the comfort and support of these mattresses.

In an attempt to overcome the aforesaid problems, mattresses were previously made with foam type materials. To form these prior foam mattresses, foam shells were either fabricated or molded around and attached to the spring unit. However, the prior foam mattresses also had many undesirable features. For instance, a primary defect of the prior foam mattress was the tendency of the outer foam covering to readily shear apart due to the stresses and strains occurring from even normal use. This was due mainly because the covering of foam material was formed or molded to, and around, the inner spring core unit. Thus, when pressure was applied to the mattress, the force against the inside of the covering due to the responsive compression and expansion of the spring unit was repeatedly concentrated at the point the covering was attached or formed to the spring unit. This caused an initial weakening at the point of attachment which eventually spread throughout the entire foam material covering the mattress. The prior foam rubber mattresses were particularly objectionable because they deteriorated quickly, especially in certain geographical areas. They became soggy and soft, had the tendency to cave in, were heavy and emanating from the deteriorated rubber was an odor which users found objectionable.

In view of the foregoing, it is a primary object of this invention to provide a simplified and improved method for fabricating mattresses.

It is another primary object to provide a method for fabricating mattresses using foam compressible materials. A related object is to provide a method for fabricating mattresses using foamed polyurethane resins or the like.

It is another object to provide a method for fabricating mattresses having an inner spring unit which does not require a physical attachment of an insulator pad to the spring unit.

It is another primary object of this invention to provide a mattress which does not shear from the stresses and strains of normal use.

It is another object to provide a mattress which does not erode into particles during normal use.

It is still another object to provide a mattress which is capable of being chemically treated to protect the same from bacteria and harmful germs.

It is a primary feature of this invention to provide a mattress comprising a compressible casing which encloses a spring unit. It is a related feature to enclose a spring unit within a pair of foam polyurethane envelopes whereby the spring unit is in frictional contact inside the envelope.

It is another feature to integrally form an insulator pad on the inner surfaces of a foam envelope. Thus, when the spring core unit is inserted into the envelopes there is no requirement to physically attach the insulator pad to the spring.

With the foregoing and other objects in view which will appear as the description proceeds, the invention consists of a novel method, certain novel features of construction, arrangement, and a combination of parts hereinafter fully described, illustrated in the accompanying drawings, and particularly pointed out in the appended claims, it being understood that various changes in the method, in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its method of construction, assembly and operation, and many of its advantages and features should be readily understood and appreciated.

Referring to the drawing in which the same characters of references are employed to indicate corresponding or similar parts throughout the several figures of the drawing.

Figure 2:
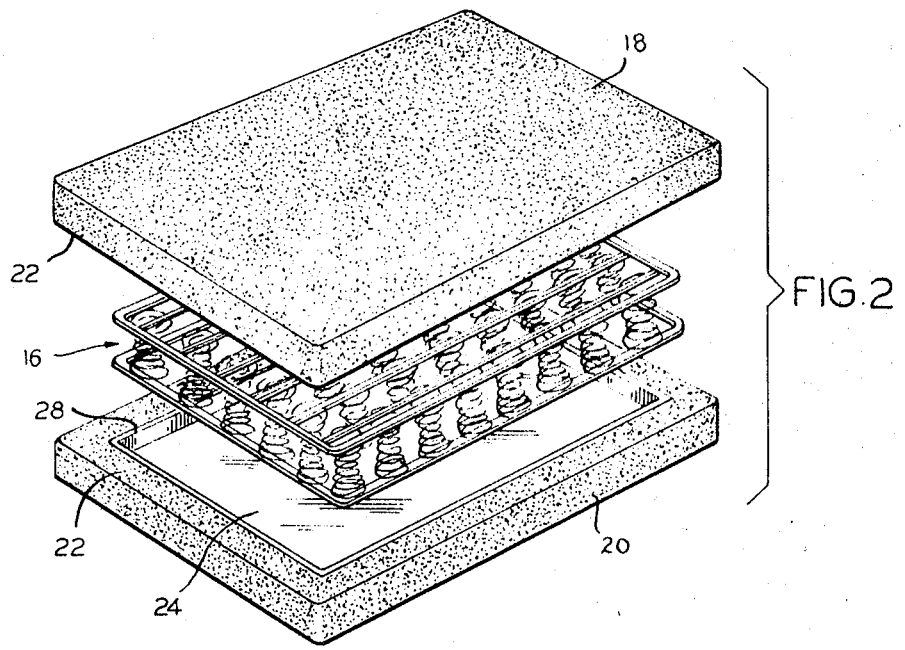
FIG. 2 is an exploded view of the main component parts of the mattress in FIG. 1 and showing upper and lower envelopes with a spring unit therebetween.
Figure 6:
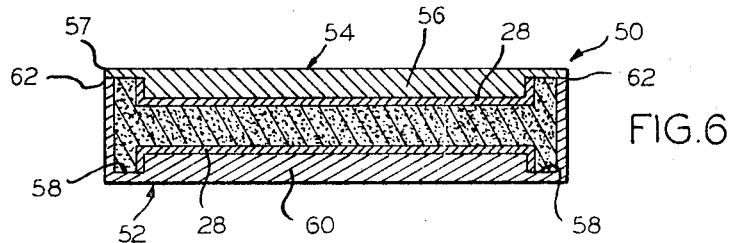
Figure 7:
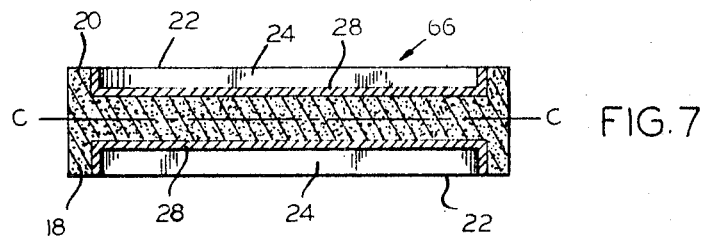

FIG. 6 is an alternative mold arrangement shown in cross-section for simultaneously forming back-to-back both of the envelopes shown in FIG. 2; and FIG. 7 is a cross-sectional view of the upper and lower mattress envelopes formed back-to-back in a single piece from the mold of FIG. 6 and indicating the cutting plane represented by the line C—C for dividing the single piece into the pair of envelopes shown in FIG. 2.

Referring to the various figures of the drawings, the novel method and mattress embodying the principles of this invention will be described. Generally, the steps of the method for fabricating the mattress indicated by the reference numeral 10 in FIG. 1, comprises: forming an outer casing to enclose a compressible support unit 16 (FIG. 2); inserting the support or spring unit 16 inside the casing and sealing the casing to secure the spring unit therein. The mattress formed in this manner may have any suitable outer configuration, but in the embodiment selected for illustration, the same comprises a substantially rectangular shape defined by the opposed sides 17 which are perpendicular to the opposed sides 17'.

The outer mattress casing is preferably formed from a sturdy, light-weight, compressible and odorless foam plastic material, although other compressible materials such as foam rubber may be used. A preferred material having these characteristics is polyurethane foam. The spring unit or inner core 16 of the mattress may be constructed from a plurality of coiled metal spring units as shown, although urethane slabs, air sacks or any other suitable supporting and cushioning materials or devices may be substituted for the spring core 16.

Figure 1:
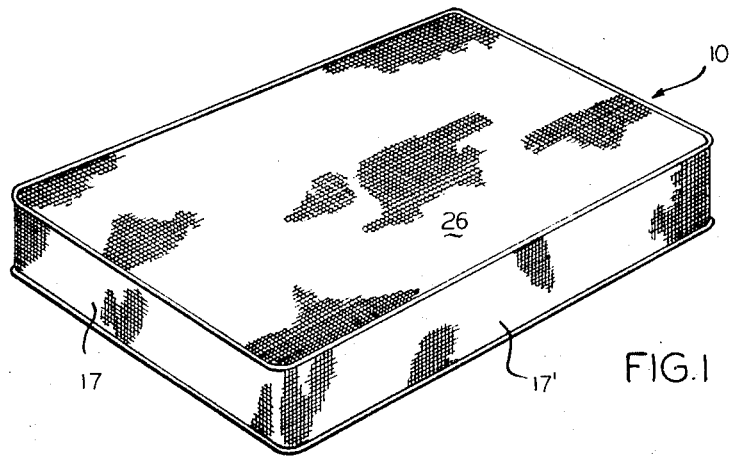
FIG. 1 is a perspective elevational view of a mattress having a foam material for an outer casing and embodying the principles of the invention.

The outer mattress casing, preferably comprises an upper envelope 18 and an identical lower envelope 20 as illustrated in FIG. 2. Each of the envelopes has an open side 22 communicating with an open cavity 24. The combined volumes of the cavities 24 of envelopes 18, 20 are substantially equivalent to the normal or unrestrained size of the support spring unit 16. Thus, when spring unit 16 is inserted into the bottom envelope 18 and the top envelope 20 placed thereover, the peripheral edges of the opposed open ends 22 of the envelopes contact each other to form a circumscribing seam 25 around the support unit and the support unit 16 is fitted within the confines of the defining walls of the cavities 24. The envelopes 18, 20 are formed or laminated together at the seam 25 by applying heat or other suitable sealing means. An outer ticking 26 is then applied over the sealed envelopes (FIGS. 1 and 3).

Figure 3:
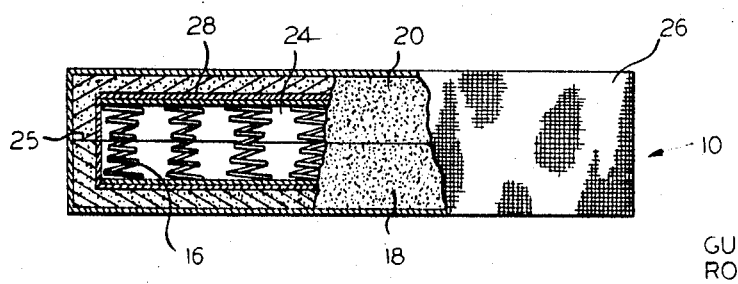
FIG. 3 is a side elevational view of the mattress in FIG. 1 with portions cut away to show the assembled parts thereof.

As shown in FIG. 3, the top and bottom surfaces of the spring unit 16 are in frictional contact with inside surfaces of the envelopes (see FIG. 3). Particularly note that in mattress 10 there is no physical attachment between the spring unit 16 and the envelopes 18, 20 to cause a repeated concentration of forces within the same localized area whenever pressure is applied to mattress 10. Hence, when pressure is applied to the top of the mattress, the responsive force of the spring unit 16 against the inside of the envelope is distributed over a substantial area. Thus, by diffusing the forces in this manner, the foam envelopes 18, 20 are safeguarded from shearing under the stresses and strains of normal use.

An insulator pad 28 may be included inside mattress 10 between the envelopes 18, 20 and the spring unit 16. The insulator pad 28 as shown in FIG. 2 is integrally formed to the defining walls of cavities 24 of the envelopes 18, 20. Thus, when the spring unit is positioned within the envelopes, the insulator pad completely covers the same. In this manner, insulator pad 28 is maintained securely in place without any physical attachment to the spring unit 16. The insulator pad is made from a strong fiber material or other suitable material. Preferably, the insulator pad material is porous so that when the envelopes are formed, the material of the envelopes will be able to seep into the pores, thereby maintaining a secure association therewith. It is particularly desirable to include an insulator pad 28 in the mattress assembly when the spring unit 16 is made of the metal spring units as shown in the illustrated embodiment. Although, the non-attachment of the spring unit substantially distributes the force from the spring unit, the insulator pad is a further safeguard for the envelopes in order to prevent their shearing apart.

Figure 4:
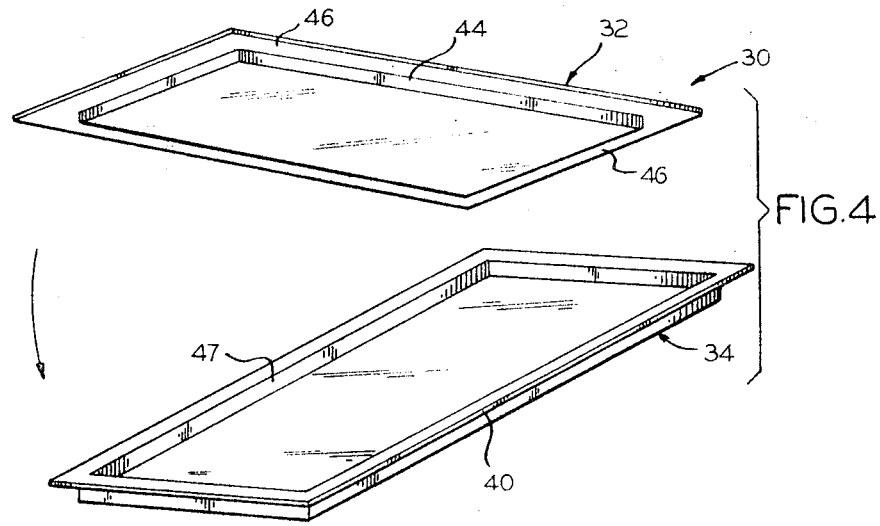
FIG. 4 is a perspective view showing the top and bottom mold sections spaced apart, and which are used to form one of the envelopes shown in FIG. 2.
Figure 5:
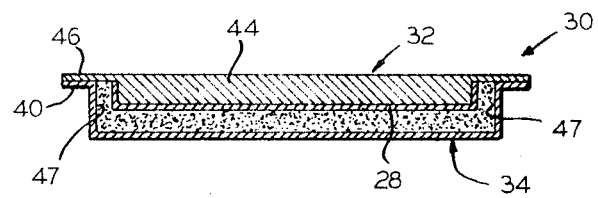
FIG. 5 is a cross-sectional view showing the top mold and bottom mold of FIG. 4 operatively positioned with one of the envelopes of FIG. 2 being formed therein.

Turning now to FIGS. 4 and 5, it will be noted that a means for forming the envelopes 18 and 20 is there illustrated. An envelope mold 30 comprising a top mold section 32 and a bottom mold 34 section, is used to form either the upper envelope 18 or the identical lower envelope 20. The bottom mold section 34 is formed with a marginal flange or lip 40 thereof. The top mold section 32 comprises a neck portion 44 having a neck length substantially equivalent to the depth of the cavity of the envelope 18 or 20. A collar 46 surrounds the upper end of neck portion 44. As shown in FIG. 5, when the peripheral edge of the collar 46 of the top mold 32 is flush with the outer edge of lip 40 of the bottom mold 34, the outer side surface of the neck portion 44 is substantially equidistance from the inside surface of sidewall 47 of the bottom mold section 34. When it is desired to form the envelopes 18 or 20 with an insulator pad 28, an insulator pad 28 is placed around neck 44 of the top mold 32 prior to the forming of the envelopes.

To form one of the envelopes 18 or 20, a pre-determined quantity of liquid foam plastic material such as liquid foam polyurethane resin is poured into the bottom mold 34. The top mold 32 is placed on bottom mold 34 immediately after the pouring of the liquid polyurethane resin and before the polyurethane resin has begun to expand out. In the operative position of the top and bottom mold 32, 34 shown in FIG. 5, neck 44 extends inside the bottom mold 34. The expansion of the foam material fills the void within the mold 30. Moreover, as the foam material expands, it seeps within the pores of the insulator pad to afford a firm body therewith upon the solidifying of the foam material. If the neck 44 of the top mold 32 causes the liquid foam material to be displaced when inserted inside the bottom mold 34, the liquid foam thus soaks within at least the lower portion of insulator pad 28, thereby insuring a firm association between the insulator pad and the foam material after the same has expanded and solidified. Upon the curing and solidifying of the foam material, envelope 18 or 20 is removed from mold 30.

Foamed polyurethane which is the preferred material for the envelopes is prepared, for example, by reacting in the presence of catalytic material, one or a combination of two or more polyisocyanates with one or a combination of two or more organic compounds capable of reacting with a polyisocyanate to produce polyurethane foams. Such organic compounds generally have at least two reactive hydroxyl groups. Molds of any form can be filled with liquid polyurethane resin, and the cured foam will take the predetermined shape of the mold. Polyurethane foams may be formed to yield predetermined densities and load deflection by varying the chemical composition prior to the pouring of the molds.

Instead of pouring liquid foam material into molds to form the enevelopes, the envelopes may also be formed from slabs of plastic material into a predetermined shape by heat and/or pressure.

As above mentioned, spring unit 16 may comprise other cushioning means than the plurality of coiled metal spring units shown in the illustrative embodiment. For example, a slab or a plurality of slabs of a compressible material, such as urethane, may be inserted inside the envelopes and sealed therein. The compressible material may have various degrees of compression due to variation in densities, etc. Even a single spring unit formed from urethane may be constructed whereby one area of the unit varies from another area of the unit, in order to maximize the support capability of the mattress. Also, sacks of air may be placed inside of the cavities of the envelopes and an air control valve or the like may be accessible from the outside of the mattress. Of course, the poundage of air would determine the compression capability of the mattress. In these alternative embodiments, it is to be particularly noted that the spring unit 16 whether it be urethane slabs or air sacks, the same are fitted or frictionally positioned inside the envelopes and do not have any rigid attachment with the envelopes.

The use of a urethane material for envelopes 18, 20 is particularly suitable to be made bacteriostatic against most household bacteria. Thus, by treating the urethane material during the chemical formation of envelopes 18, 20 with biologically active chemicals, then sealing the envelopes 18, 20 together with spring unit 16 enclosed therein, the main body of the mattress 10 is protected against bacteria. To provide a mattress completely protected from bacteria the covering or ticking which is placed over the mattress should also be similarly chemically treated. Moreover, chemical additives may also be included in the chemical composition of the urethane to render the same fire resistant.

Urethane material is purely a chemical product, and in no way associated with animal or vegetable matter. Hence, mattresses formed from urethane or similar chemical products are particularly suitable for use by an allergic or allergy-prone person.

Alternatively, the upper and lower envelopes 18, 20 may be formed simultaneously and in one piece by using the envelope mold 50 shown in FIG. 6. Mold 50 comprises a bottom mold section 52 and a top mold section 54. The top mold section 54 includes a top neck portion 56 spaced inward from the outer edges 57 thereof. The bottom mold section 52 has a recess 58 extending around the periphery of the inside bottom surface to define a bottom neck 60. The neck length of the top and bottom necks 56, 58 is identical and substantially equivalent to the depth of the cavities 24 within the upper and lower envelopes 18, 20. As shown in FIG. 6, when the outer edges 57 of the top mold section are substantially aligned with the peripheral edges 62 at the open end of the bottom mold section 52, the necks 56, 60 are spaced from each other and in substantial vertical alignment.

Similar to the forming of the upper or lower envelope 18, 20, previously described, a predetermined quantity of liquid plastic foam material such as liquid polyurethane foam resin is poured into the bottom mold section 52. The top section is positioned on the bottom mold section 52 as shown in FIG. 6 with the top neck 44 extending into the bottom mold section 52. The expanding foam fills the void within mold 50. After the liquid foam material has sufficiently cured and assumed the form of the mold, the mold sections 52, 54 are removed leaving the one piece complete mattress envelope 66 shown in FIG. 7. The complete envelope 66 comprises the upper and lower envelopes 18, 20 integrally formed together in a back-to-back relationship. Hence, to sever the envelopes 18, 20 apart, it is merely required to slice the complete envelope 66 substantially through the plane of the line C—C in FIG. 7.

It should thus be apparent without further description that we have provided an improved method for manufacturing mattresses using foam plastic material and an improved and novel mattress formed by this method. By positioning the spring unit 16 or other compressible means inside a pair of envelopes 18, 20 without physically attaching any part thereof to the interior of the envelopes, the spring unit is thereby able to provide support and comfort without causing the mattress envelopes to shear due to normal stresses and strains.

Moreover, the method of forming the mattress herein also provides steps to integrally secure the insulator pad 28 to the sides of the cavities 24 of envelopes 18 and 20. Furthermore, by making the insulator part of a porous material, the liquid foam material is thus able to seep within the pores and make a secure bond therewith upon the subsequent solidification of such liquid foam material.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. A method for making mattresses comprising the steps of:

molding a hollow shell of foamed plastic material made from polyurethane resins in two identical parts, said parts comprising an upper cover and a lower cover, each of said covers having opposed marginal edges;

inserting a compressible support means between said covers, said support means being in free frictional contact with the inner surfaces of said covers; and joining said opposed marginal edges together to form said shell with the support means positioned therein said envelopes being formed by pouring a predetermined quantity of foamable liquid polyurethane material into a mold having a cavity with an I-shaped cross-section, reacting said material and causing the same to expand and substantially fill said cavity, removing said mold leaving a solid foam shape having an I-shaped cross-section and slicing said solid foam shape to form two substantially identical envelopes, the cut surfaces formed by said slicing forming the major exterior plane surfaces of each of said envelopes.

2. A method for fabricating a mattress as claimed in claim 1, wherein an insulator pad is integrally formed to the inside surface of the upper and lower covers prior to inserting the compressible support means within the covers.

3. A method for making mattresses comprising the steps of:

molding a hollow shell of foamed plastic material made from polyurethane resins in two identical parts, said parts comprising an upper cover and a lower cover, each of said covers having opposed marginal edges; inserting a compressible support means between said covers, said support means being in free frictional contact with the inner surface of said covers; and joining said opposed marginal edges together to form said shell with the support means positioned therein wherein said envelopes are formed by:

pouring a predetermined quantity of liquid polyurethane foam material into a bottom mold, said bottom mold having a hollow inside communicating with an open end thereof and a lower neck extending upward from the inner bottom wall and spaced from the inner side walls;

inserting an upper neck of a top mold into said bottom mold whereby the upper neck is spaced from the side walls of said mold and spaced from the lower neck but in substantial vertical alignment therewith;

reacting said foam material to cause the same to expand and substantially fill the space around and between said necks and solidify thereafter to the form of the molds;

removing the top and bottom molds from said formed foam material, whereby the removal of the upper and lower necks leaves an upper and lower cavity communicating with the outside and spaced apart from each other by a portion of said formed foam material; and slicing said formed foam material to form two substantially identical envelopes, the cut surfaces formed by said slicing forming the major exterior plane surfaces of each of said envelopes.

References Cited

UNITED STATES PATENTS

| | | | |
|---|---|---|---|
| 2,836,228 | 5/1958 | Dahle | 161—44 |
| 3,026,544 | 3/1962 | Persicke et al. | 5—361 |
| 3,043,731 | 7/1962 | Hill | 156—250 XR |
| 2,425,728 | 8/1947 | Cobb | 5—351 |
| 2,585,415 | 2/1952 | Toms | 5—351 |
| 2,821,243 | 1/1958 | Toulmin | 5—351 |
| 3,204,016 | 8/1965 | Sanger et al. | 5—351 |

FOREIGN PATENTS 678,562  9/1952  Great Britain.

EARL M. BERGERT, Primary Examiner

W. E. HOAG, Assistant Examiner

U.S. Cl. X.R.

5—351; 156—245, 254, 264; 264—152